United States Patent

[11] 3,588,421

| [72] | Inventor | Albert Herbert Ball<br>Walsall, England |
|---|---|---|
| [21] | Appl. No. | 812,659 |
| [22] | Filed | Apr. 2, 1969 |
| [45] | Patented | June 28, 1971 |
| [73] | Assignee | Joseph Lucas (Industries) Limited<br>Birmingham, England |
| [32] | Priority | Apr. 5, 1968 |
| [33] | | Great Britain |
| [31] | | 16,516/68 |

[54] IGNITION DISTRIBUTOR CASING AND SEALING MEANS THEREFOR
4 Claims, 4 Drawing Figs.

| [52] | U.S. Cl. | 200/168, 200/19 |
|---|---|---|
| [51] | Int. Cl. | H01h 9/04 |
| [50] | Field of Search | 200/168 (G), 19, 31, 30 |

[56] References Cited
UNITED STATES PATENTS
2,923,785  2/1960  Longenecker............... 200/19(X)

*Primary Examiner*—H. O. Jones
*Attorney*—Holman, Glascock, Downing and Seebold

ABSTRACT: An ignition distributor including a hollow casing which is closed at one end by a detachable cap. The cap is secured to the casing by pivotable clips, and the casing supports a contact breaker assembly. The contact breaker assembly includes a base plate having tags which are received in slots in the wall of the casing, and the cap includes portions which engage in said slots to close said slots. However, owing to manufacturing tolerances the cap does not completely close said slots, and a pair of sealing members are provided for sealing said slots against ingress of dirt and moisture into the mechanism of the distributor. Said sealing members are positioned between the clips and the casing covering said slots and the clips urge the sealing members into engagement with the casing and the caps so that said slots are sealed.

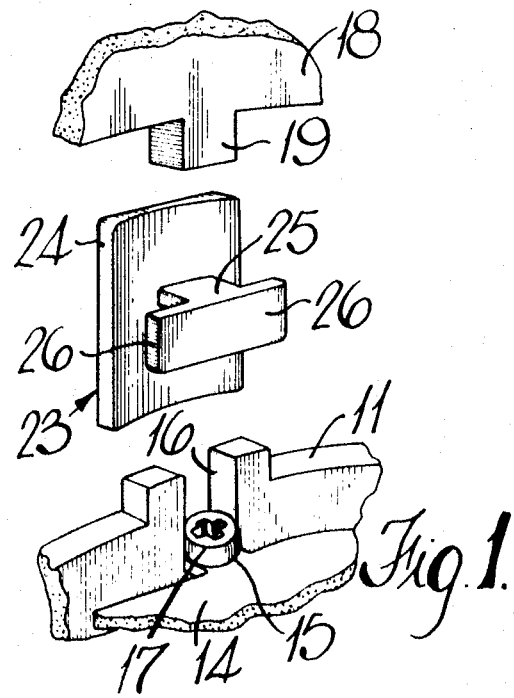
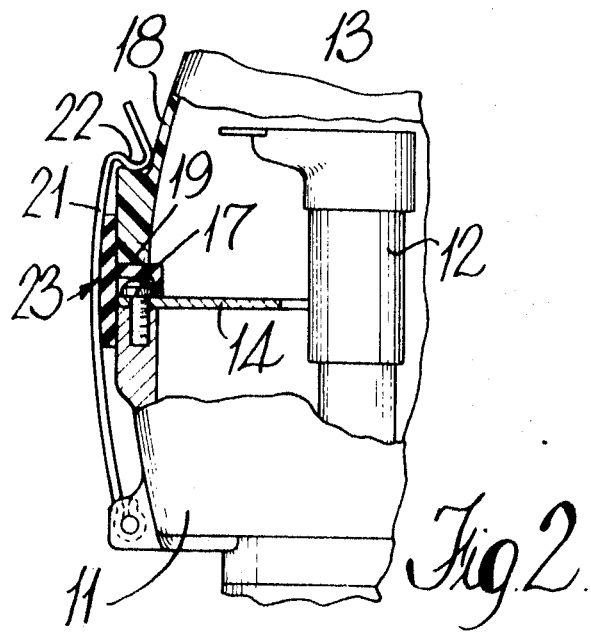

IGNITION DISTRIBUTOR CASING AND SEALING MEANS THEREFOR

This invention relates to ignition distributors, for road vehicles, of the kind comprising, a hollow casing open at one end, a contact breaker assembly including a baseplate housed within said casing, the casing being formed with a slot extending from said open end within which a tag integral with said baseplate is received, a cap engaged with said casing and closing the open end of the casing, and a clip extending between the casing and the cap and serving to maintain the cap engaged with the casing.

In certain distributors of the kind specified water can enter the distributor through clearances between the walls of said slot, said tag and the cap, and it is an object of the present invention to minimize ingress of water into the distributor through these clearances.

According to the invention in a distributor of the kind specified, said clip extends adjacent said slot and a resilient sealing member is positioned between the clip and the casing and the cap covering said slot, said clip serving to urge the sealing member into engagement with the casing and the cap to seal said slot.

Figure 3:
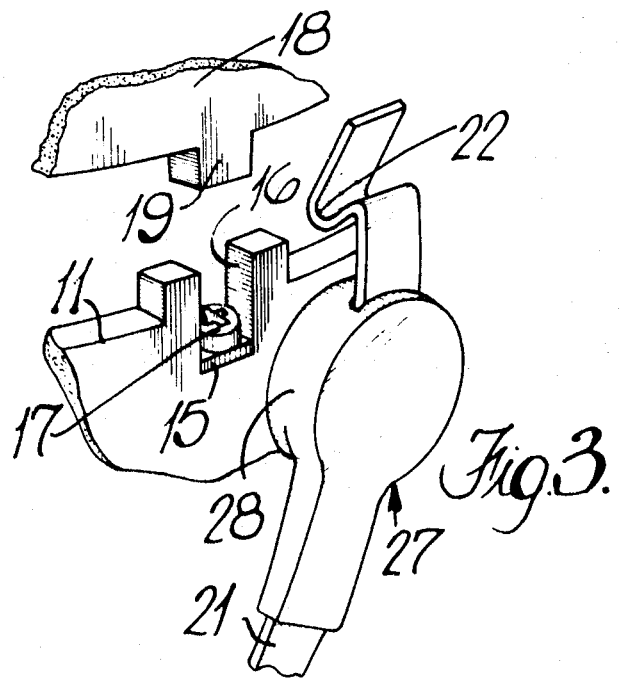
Figure 4:
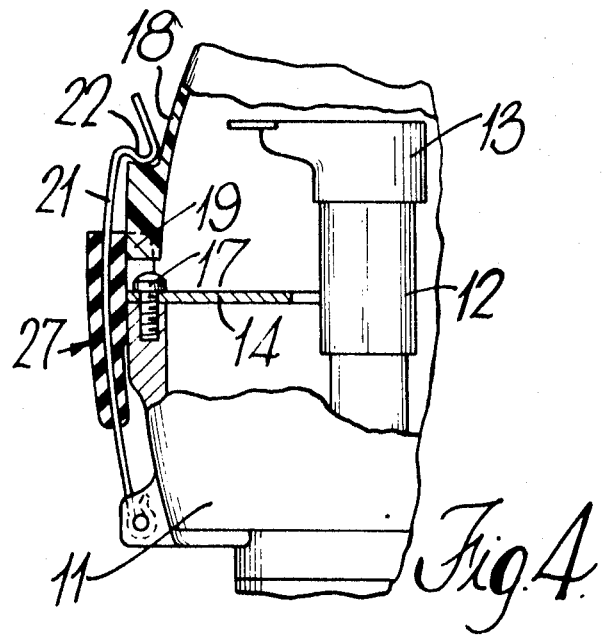

In the accompanying drawing:

FIG. 1 is a fragmentary exploded perspective view of an ignition distributor according to a first example of the invention, FIG. 2 is a fragmentary sectional view of the distributor shown in FIG. 1 assembled, FIG. 3 is a view similar to FIG. 1 of a second example of the invention and FIG. 4 is a fragmentary sectional view of the distributor shown in FIG. 3 assembled.

Referring first to FIGS. 1 and 2, the ignition distributor includes a generally cylindrical casing 11 having a cam shaft 12 mounted for rotation therein. The casing houses the contact breaker assembly of the distributor, and the rotor arm 13 of the distributor is carried at the upper free end of the cam shaft 12. The contact breaker assembly of the distributor includes a baseplate 14 which fits within the casing 11, and which includes a pair of outwardly directed tags 15 which are received in slots 16 in the wall of the casing. A pair of screws 17 extend through the tags 15 respectively into engagement with the casing 11 to secure the contact breaker assembly in the casing. A generally hemispherical moulded synthetic resin cap 18 is engageable with the casing 11 to close the casing, and the cap 18 carries a plurality of distribution terminals through which, in use, the sparking plugs of an engine, with which the distributor is utilized, are supplied in turn with firing pulses. The cap 18 includes an integral axially extending flange (not shown) which engages the inner periphery of the casing 11 when the cap 18 and the casing 11 are interengaged. The cap 18 and the casing 11 include interengaging parts which ensure that the cap is assembled in the correct angular relationship with respect to the casing, and mechanism of the distributor, and the flange of the cap helps to prevent ingress of water into the distributor between the casing and the cap. The cap also includes integral lugs 19 which extend into the slots 16 in the casing but owing to manufacturing tolerances, clearances exist between the walls of the slots 16, the tags 15, the screws 17, and the lugs 19, through which water can enter the distributor.

A pair of spring steel clips 21 are pivotally engaged with the casing 11 at diametrically opposite points thereon, and at their ends remote from the pivotal interconnection with the casing each of the clips 21 is bent to define a lug 22 which is engageable in a respective recess moulded into the cap, so that the clips 21 maintain the cap 18 engaged with the casing 11. The spring clips 21 extend adjacent the slots 16 in the casing 11.

In order to minimize ingress of water into the distributor through said clearances a sealing member 23 is engaged in each of the slots 16. Each sealing member 23 is moulded in a soft rubberlike material and includes an outer rectangular portion 24 of dimensions greater than the dimensions of the slots 16, a neck portion 25 integral with the portion 24, and of width equal to the width of the slots 16, and a pair of wing portions 26 which extend outwardly from the end of the neck portion 25 remote from the rectangular portion 24. Each sealing member 23 is engaged with the respective slot 16 with its rectangular portion 24 engaged with the outer periphery of the casing 11, its neck portion 25 extending through the slot 16, and its wing portion 26 engaging the inner surface of the casing 11 to prevent the sealing member 23 being disengaged from the casing 11 in a radial direction. The rectangular portion 24 of each sealing member 23 is so dimensioned that in addition to covering the slot 16 it overlaps part of the cap 18 adjacent the slot 16. When the cap and the casing are interengaged, and the clips 21 are in position, the clips 21 overlie the rectangular portions 24 of the sealing members and press the portions 24 into sealing engagement with the exterior surface of the casing and the cap, thereby sealing said clearances.

In the second example shown in FIGS. 3 and 4 the sealing members are constituted by moulded rubber sleeves 27 which are threaded over the clips 21, and which are so positioned on the clips 21 that when the clips are in their operative positions then the sleeves 27 are pressed against the exterior of the casing and the cap so as to seal said clearances, the sleeves 27 being provided with enlarged portions 28 adjacent the slots 16.

Having thus described our invention what we claim as new and desire to secure by Letters Patent is:

I claim:

1. An ignition distributor of the kind comprising:
    a hollow casing open at one end;
    a contact breaker assembly, including;
    a baseplate, the baseplate housed within said casing, and the casing formed with a slot extending from said open end thereof within which a tag integral with said baseplate is received;
    a cap engaged with said casing and closing the open end of the casing; and
    a clip extending between the casing and the cap and serving to maintain the cap engaged with the casing, the improvement comprising;
    a sealing member positioned between said clip and the casing and the cap, and covering said slot, said clip extending adjacent said slot, and serving to urge the sealing member into engagement with the casing and the cap to seal said slot.

2. A distributor as claimed in claim 5 wherein said sealing member includes a portion which extends within said slot.

3. A distributor as claimed in claim 1 wherein the sealing member is carried by the casing.

4. A distributor as claimed in claim 1 wherein the sealing member is carried by said clip.